United States Patent [19]

Rosenberg

[11] Patent Number: 5,191,631
[45] Date of Patent: Mar. 2, 1993

[54] HYBRID OPTICAL FIBER AND METHOD OF INCREASING THE EFFECTIVE AREA OF OPTICAL TRANSMISSION USING SAME

[75] Inventor: Robert L. Rosenberg, Fair Haven, N.J.

[73] Assignee: AT&T Bell Laboratories, Murray Hill, N.J.

[21] Appl. No.: 810,625

[22] Filed: Dec. 19, 1991

[51] Int. Cl.⁵ .......................... G02B 6/10; G02F 1/00
[52] U.S. Cl. ...................................... 385/123; 385/31; 385/38; 385/50; 359/173
[58] Field of Search ........... 385/31, 38, 39, 49, 385/50, 95, 96, 98, 122, 123, 147; 359/124, 173

[56] References Cited

U.S. PATENT DOCUMENTS

| | | | |
|---|---|---|---|
| 4,261,639 | 4/1981 | Kogelnik et al. | 385/27 X |
| 4,558,921 | 12/1985 | Hasegawa et al. | 385/39 |
| 4,639,075 | 1/1987 | Salour et al. | 385/31 |
| 4,685,107 | 8/1987 | Kafka et al. | 372/6 |
| 4,715,679 | 12/1987 | Bhagavatula | 385/127 |
| 4,768,853 | 9/1988 | Bhagavatula | 385/37 |
| 4,777,663 | 10/1988 | Charlton | 359/124 |
| 4,877,304 | 10/1989 | Bhagavatula | 385/123 |
| 4,913,520 | 4/1990 | Kafka | 385/123 |
| 4,953,947 | 9/1990 | Bhagavatula | 385/31 |
| 4,969,710 | 11/1990 | Tick et al. | 385/123 |
| 5,042,906 | 8/1991 | Chesler et al. | 385/27 |

OTHER PUBLICATIONS

A. D. Ellis et al., *Elec. Lett.*, vol. 27, No. 10, May 9, 1991, "5 Gbit/s Soliton Progpagation over 350 km . . . ," pp. 878–880.

*Primary Examiner*—Brian Healy
*Attorney, Agent, or Firm*—G. A. deBlasi

[57] ABSTRACT

A hybrid fiber which, at the operating wavelength, has a desirable fiber dispersion characteristic and a relatively large effective area is provided. Hybrid fibers are constructed in accordance with the principles of the invention by splicing together a fiber with a large effective area but typically unsatisfactory fiber dispersion characteristics to a fiber having excellent dispersion characteristics but a smaller effective area. The resulting hybrid fiber has an increased effective area and desirable fiber dispersion characteristics at the low-loss operating wavelength.

19 Claims, 1 Drawing Sheet

HYBRID OPTICAL FIBER AND METHOD OF INCREASING THE EFFECTIVE AREA OF OPTICAL TRANSMISSION USING SAME

FIELD OF THE INVENTION

This invention relates to optical fiber cables and, more particularly, to hybrid optical fibers.

BACKGROUND OF THE INVENTION

Nonlinear effects in optical fibers limit the distance over which non-repeatered or non-regenerated lightwave communications can occur. Nonlinear effects such as stimulated Brillouin scattering and stimulated Raman scattering manifest themselves as power-dependent excess fiber losses which limit the transmission distance between repeaters. Another type of nonlinear limitation occurs in longhaul fiber systems in which the signal pulses are boosted by optical amplifiers placed at more or less uniform intervals along the transmission path. The total length of such a system is limited by the cumulative nonlinear phase shifts imposed on the pulse envelopes by the optical nonlinearity of the transmission fibers. The peaks of the pulses, where the optical power is largest, are repeatedly phase-shifted relative to the tails of the pulses, where power is low. For a system length large enough to allow the relative nonlinear phase shifts to approach $\pi/2$, the pulse distortions are too large to permit recovery of the signal with a low error rate.

The magnitude of such nonlinear effects is proportional to the optical power density of a signal and is thus inversely proportional to the effective cross-sectional area $A_{eff}$ for nonlinear effects in an optical fiber (hereinafter referred to as the effective area of the fiber). Thus, a larger effective area permits longer fiber spans between repeaters and longer systems, which result in more cost effective and more capable communication systems. Certain commercially-available fibers have a relatively large effective area.

Fiber dispersion is another optical characteristic of a fiber which impacts optical transmission. Fiber dispersion causes spreading of the frequency spectrum of typical non-return-to-zero (NRZ) pulses transmitted through the fiber. As a result, the signal spectrum can broaden cumulatively along a fiber transmission system. Since pre-receiver filtering must have a bandwidth large enough to allow detection of the important frequency components of the signal, larger dispersion requires larger filtering bandwidth. As a result, more of the broadband noise from the optical amplifiers in the transmission path must be admitted into the receiver, with a consequent degradation of signal-to-noise ratio and increased error rates. Thus, it is desirable to achieve zero fiber dispersion at the operating wavelength (typically near 1550 nanometers) of NRZ transmission systems. If soliton pulses are used to transmit information, the useful dispersion tends to be relatively small and positive, but not zero. Certain commercially available fibers, known as dispersion-shifted fibers, achieve zero-dispersion at wavelengths near 1550 nanometers. Other commercially available fibers have zero-dispersion wavelengths near 1310 nanometers, and very large dispersion near 1550 nanometers.

While there are some fibers having large effective areas and other fibers having minimal dispersion at the desired wavelengths, there are no commercially available optical fibers which, at the operating wavelength, have both a desirable fiber dispersion characteristic and a relatively large effective area. Commercial fibers that have a relatively large effective area typically exhibit poor fiber dispersion characteristics at the operating wavelength whereas other commercial fibers that have desirable fiber dispersion characteristics at the operating wavelength typically exhibit a relatively small effective area. Usually, a system design specifies one type of fiber thereby incurring the penalty of either high dispersion or small effective area.

SUMMARY OF THE INVENTION

Optical fibers of different physical characteristics may be combined to produce a hybrid fiber which, at the operating wavelength, has a desirable fiber dispersion characteristic and a relatively large effective area. Hybrid fibers are constructed in accordance with the principles of the invention by splicing together a fiber with a large effective area but typically unsatisfactory fiber dispersion characteristics to a fiber having excellent dispersion characteristics but a smaller effective area.

In a preferred embodiment of the invention, the segment of the hybrid fiber that has the largest effective area is positioned nearer to the head end of the system (i.e., nearer to the source or upstream amplifier). Placement of the segment of fiber with the largest effective area at the head end of the hybrid fiber span ensures that the optical power density is reduced where the signal is most intense because the optical mode of the signal is spread over a larger effective area. This, in turn, minimizes the undesirable nonlinear effects in the fiber.

BRIEF DESCRIPTION OF THE DRAWINGS

The above and other advantages of the invention will be apparent upon consideration of the following detailed description taken in conjunction with the accompanying drawings in which like reference numbers refer to like parts throughout and in which.

DETAILED DESCRIPTION

The present invention provides a method for combining segments of commercially-available optical fibers to produce a hybrid optical fiber having the desired physical characteristics. More particularly, an optical fiber having a large effective area may be spliced with a dispersion-shifted fiber to produce a hybrid fiber span having an increased effective area and controlled low fiber dispersion. The resulting increase in effective area (over ordinary dispersion-shifted fiber) permits larger design windows for soliton and NRZ optical transmission systems, longer fiber spans between repeaters, and longer systems.

Figure 1:
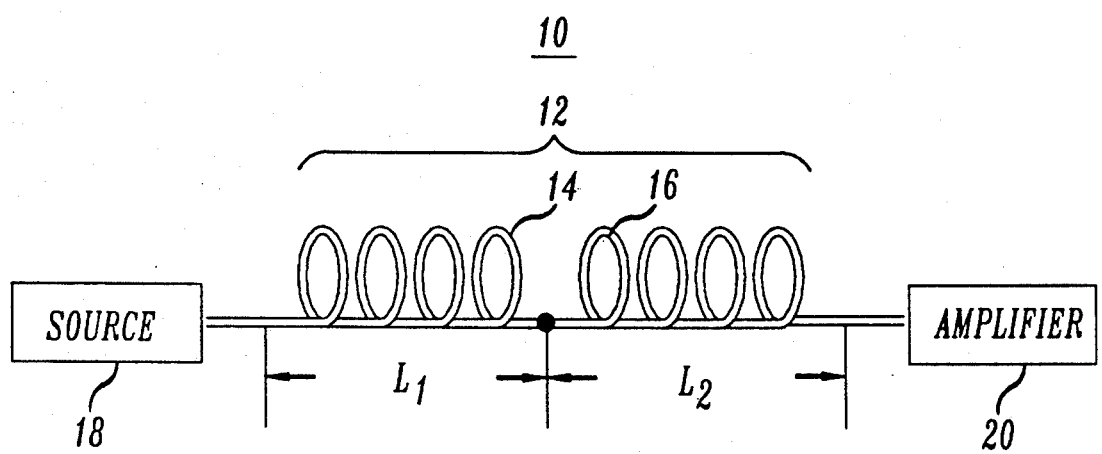
FIG. 1 is a schematic drawing of a hybrid optical fiber span in accordance with the principles of the present invention.

FIG. 1 shows a portion of an optical fiber system 10, which includes a span of hybrid optical fiber 12, an optical source 18, and an amplifier 20. Hybrid optical fiber 12 is constructed by splicing a first predetermined length $L_1$ of a first optical fiber 14 to a second predetermined length $L_2$ of a second optical fiber 16. Splicing is performed by conventional methods known to persons skilled in the art. Splicing techniques are described in Stephen C. Mettler et al., "Optical Fiber Splicing," *Optical Fiber Telecommunications II*, (Stewart E. Miller et al. eds., 1988), pp. 263-300.

While hybrid fiber 12 is shown coupled between light source 18 and amplifier 20, it is only for illustrative purposes to understand the invention and not for purposes of limitation. In other portions of optical fiber system 10, hybrid fiber 12 could be coupled between two amplifiers, two repeaters, an amplifier and a repeater, or other such combinations.

Fiber 16 typically has excellent chromatic dispersion characteristics near the fiber-loss minimum, and therefore forms the bulk of span 12. One suitable fiber is a dispersion-shifted fiber commercially available from AT&T. This fiber has a dispersion characteristic of approximately $0.057 \cdot (\lambda_{oper} - \lambda_o)$ ps/(nm·km) at a wavelength of 1550 nanometers, where $\lambda_o$ (nm) is the wavelength where dispersion vanishes, and $\lambda_{oper}$ (nm) is the operating wavelength. However, the typical AT&T dispersion-shifted fiber has had a relatively small effective area, nominally 35 $\mu m^2$. The small effective area of the fiber necessitates using additional repeaters in the optical fiber system.

Fiber 14 has a large effective area. However, commercially available fibers that have a high effective area typically do not have acceptable fiber dispersion characteristics at the operating wavelength for long haul applications and, therefore, cannot be used alone. One commercially-available fiber suitable for the present application is 5 D fiber manufactured by AT&T Network Systems, Atlanta Works. The effective area of 5 D fiber is approximately 83 $\mu m^2$ at operating wavelengths near 1550 nanometers. However, the zero dispersion wavelength of 5 D fiber is 1310 nanometers. At an operating wavelength near 1550 nanometers, the dispersion of 5 D fiber is approximately 17 ps/(nm·km), substantially higher than the $0.057 \cdot (\lambda_{oper} - \lambda_o)$ ps/(nm·km) characteristic of fiber 16 described above.

Appropriate proportions of the constituent fibers in the hybrid fiber can be determined iteratively by starting with a target value of the hybrid fiber dispersion characteristic D. For example, a hybrid fiber formed using a 5 D fiber and a dispersion-shifted fiber (with fiber dispersion characteristics of 17 and $0.057 \cdot (\lambda_{oper} - \lambda_o)$ ps/(nm·km), respectively, at wavelengths near 1550 nm) may be constructed in a proportion determined according to the relationship:

$$D = 17x + 0.057(\lambda_{oper} - 1550)(1-x),$$

where:

D is the initial target value of the fiber dispersion characteristic of the hybrid;

x is the ratio of the length of 5 D fiber to the total length of the hybrid span; and $\lambda_{oper}$ is the operating wavelength expressed in nanometers.

Specification of $\lambda_{oper}$ and D then yields the fraction x, which can be used in the following relation to determine the Raman-weighted effective area $A_H$ of the hybrid fiber:

$$\frac{A_H}{A_2} = \frac{(G-1)/G}{\left[\frac{A_2}{A_1} + \left(1 - \frac{A_2}{A_1}\right)\frac{1}{G^x} - \frac{1}{G}\right]}$$

where:

$A_1$ is the effective area of the first fiber (i.e., the fiber with the greater effective area and greater fiber dispersion);

$A_2$ is the effective area of the second fiber (i.e., the fiber with the lower effective area and lower fiber dispersion);

G is the gain of the amplifier or repeater as seen by the fiber, or exp $(\alpha L_{span})$, where $\alpha$ is the effective absorption coefficient of the hybrid fiber and $L_{span}$ is the length of the hybrid fiber; and x is the fraction of the total length of the hybrid fiber represented by the first fiber.

In a typical system design, the values of D and $A_H$ are determined iteratively to attain optimum system performance.

The table below provides a sample comparison of the characteristics of 5 D fiber, commercial AT&T dispersion-shifted fiber, and a hybrid fiber constructed in accordance with the principles of the invention. The hybrid fiber includes 13.8% 5 D fiber and 86.2% dispersion-shifted fiber by length. Thus, x=0.138. For purposes of this example, we must also specify a fiber span length L (60 km), an operating wavelength $\lambda_{oper}$(1553 nm), and the fiber loss parameter (0.22 dB/km). The latter parameter corresponds to an absorption coefficient $\alpha = 0.05066$ km$^{-1}$.

| Fiber | Raman - Weighted Characteristics | |
|---|---|---|
| | $A_{eff}(\mu m^2)$ | D (ps/nm · km) at 1553 nm |
| 5D | 83 | 17.0 |
| DSF | 35 | 0.40 |
| Hybrid | 44 | 2.5 |

The fiber dispersion characteristic of the hybrid fiber is obtained by a simple length weighted average of the characteristics of the 5 D and dispersion-shifted fibers. The effective area of the hybrid fiber is determined in accordance with the Raman-weighted relation provided above. The ratio of the hybrid effective area to the effective area of the simple dispersion-shifted fiber preferably is large enough to yield a substantial commercial benefit. An example of such a commercial benefit is an increase in span length of about one kilometer over simple dispersion-shifted fiber in multi-megameter fiber/amplifier cascades. The example, with D=2.5 ps/(nm·km), is substantially advantageous for the transmission of soliton pulses. Thus, the hybrid fiber of the present invention combines the constituent fibers to produce a hybrid fiber of superior characteristics.

The nonlinear phase shift of an optical wave propagating in a fiber is proportional to the optical power density, $P/A_H$ (where P is the total power flowing through a cross-section of the fiber.) Consequently, nonlinear effects are inversely proportional to the effective area. Thus, in a preferred embodiment of the invention, the segment of fiber that has the largest effective area of the constituent fibers in the hybrid is placed where the power flowing through the hybrid fiber is largest, typically adjacent to the source (or amplifier/repeater). The large effective area decreases the optical power density to minimize the nonlinear effects. By minimizing the nonlinear effects, larger fiber spans between repeaters may be obtained. Optical power is reduced by line losses as it is transmitted farther from the source, making the effects of nonlinearities increasingly less significant. If the hybrid fiber includes more than two constituent fibers, the hybrid fiber is preferably constructed such that the component fibers decrease in effective area as the hybrid fiber extends away from the source (or amplifier/repeater).

Figure 2:
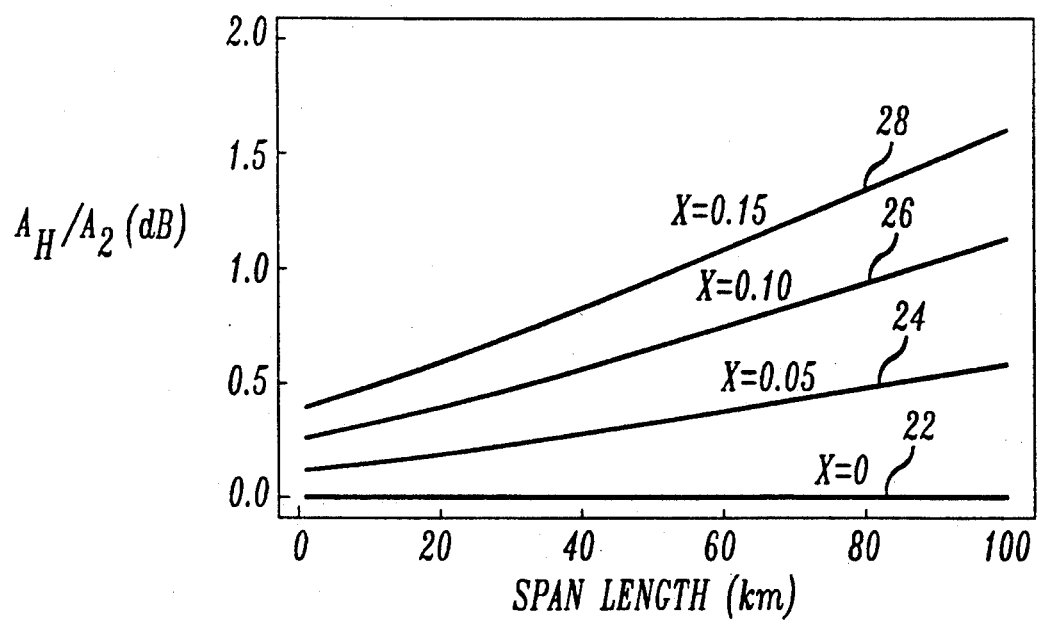
FIG. 2 is a graph illustrating the increased Raman-weighted effective area of hybrid fibers constructed in accordance with the principles of the present invention.

As shown in FIG. 2, the net effective area (i.e., the average effective area over the hybrid fiber) of an illustrative hybrid fiber span depends on the fraction of the span formed by the constituent fiber with the larger effective area. The net effective area of the hybrid fiber also depends on the ratio of effective areas of the constituent fiber segments. The flat line at 0.0 dB (designated by reference number 22) represents a simple, single-segment dispersion shifted fiber (having a small effective nonlinear area). Lines 24, 26, and 28 illustrate that the net effective area of the hybrid fiber increases as the proportion of large effective area fiber to dispersion shifted fiber increases from 5 to 15 percent, respectively, and as the total span length increases. Nevertheless, the average fiber dispersion characteristic of the hybrid fiber remains relatively small at the operating wavelength. This result was not possible in the prior art.

Although the invention has been described largely in terms of combining 5D and dispersion shifted fiber, it will be apparent to one of ordinary skill in the art that other types of optical fiber could be combined in accordance with the principles of this invention to construct a hybrid fiber. Similarly, as alluded to above, the hybrid fiber also may be constructed using three or more different types of fiber. In still another preferred embodiment, the dispersion-shifted fiber component of the hybrid fiber is constructed using several small segments with different fiber dispersion characteristics. The latter technique permits greater flexibility in selecting fibers for manufacturing a hybrid fiber because the characteristics of individual fibers may vary as long as the average fiber dispersion characteristic is satisfactory for the desired application. Furthermore, the use of several segments also implies that for a given span-average value of D, $A_H$ can be somewhat adjustable rather than uniquely determined.

Hybrid fibers constructed in accordance with the principles of the invention are particularly well-suited for soliton transmission. Soliton transmission requires the presence of a small amount of fiber dispersion at the operating wavelength. Fiber dispersion present in optical fibers such as the 5D fiber described above can be advantageously used to achieve the desired dispersion for soliton transmission, while the 5D fiber also provides a large effective area.

I claim:

1. A hybrid optical fiber, comprising:
   a first fiber segment having a first effective area and a first fiber dispersion characteristic at a predetermined operating wavelength;
   a second fiber segment coupled to the first fiber segment to form the hybrid fiber, the second fiber segment having a second effective area and a second fiber dispersion characteristic at the predetermined operating wavelength, wherein the first effective area is substantially larger than the second effective area and the second fiber dispersion characteristic is substantially lower than the first fiber dispersion characteristic so that the hybrid fiber has a length-weighted fiber dispersion characteristic and a third effective area which is greater than the second effective area.

2. The hybrid fiber of claim 1 wherein for a predetermined average fiber dispersion characteristic of the hybrid fiber, the effective area $A_H$ of the hybrid fiber is determined according to the equation:

$$\frac{A_H}{A_2} = \frac{(G-1)/G}{\left[\frac{A_2}{A_1} + \left(1 - \frac{A_2}{A_1}\right)\frac{1}{G^x} - \frac{1}{G}\right]}$$

where:
   $A_H$ is the effective area of the hybrid fiber;
   $A_1$ is the effective area of the first fiber;
   $A_2$ is the effective area of the second fiber;
   G equals $\exp(\alpha L_{span})$, where $\alpha$ is the effective absorption coefficient of the hybrid fiber and $L_{span}$ is the length of the hybrid fiber; and
   x is the fraction of the total length of the hybrid fiber represented by the first fiber.

3. The hybrid fiber of claim 2 wherein x, G, $A_1$, $A_2$, and the first and second fiber dispersion characteristics are selected such that D and $A_H$ are optimized for best system performance, and $A_H/A_2$ is sufficiently large to permit a span-length increase of at least about one kilometer.

4. The hybrid fiber of claim 1 wherein the first fiber segment has an effective area of about 83 $\mu m^2$ at an operating wavelength near 1550 nm.

5. The hybrid fiber of claim 4 wherein the hybrid fiber has an average fiber dispersion characteristic in the range of about 0 to 3 ps/(nm·km).

6. The hybrid fiber of claim 1 wherein the second fiber segment comprises a dispersion-shifted optical fiber.

7. The hybrid fiber of claim 1 further comprising a third fiber segment, coupled to one of the first and second fiber segments.

8. A method for increasing the effective area of optical transmission fiber, comprising the steps of:
   forming a hybrid fiber comprising a first fiber segment having a first predetermined effective area and a first fiber dispersion characteristic at a predetermined operating wavelength, and a second fiber segment with a second predetermined effective area and a second fiber dispersion characteristic at the predetermined operating wavelength, said first predetermined effective area being substantially larger than said second predetermined effective area, so that the hybrid fiber has a length-weighted fiber dispersion characteristic and a third effective area which is greater than the second effective area; and
   coupling the hybrid fiber to a light source such that the first fiber segment is adjacent to the source.

9. The method of claim 8 wherein the first fiber segment has an effective area of about 83 $\mu m^2$ and the hybrid fiber has an average fiber dispersion characteristic in the range of about 0 to 3 ps/(nm·km) at an operating wavelength near 1550 nm.

10. The method of claim 8 wherein the second fiber segment comprises a dispersion-shifted optical fiber.

11. The method of claim 8 wherein for a predetermined average fiber dispersion characteristic of the hybrid fiber, the effective area $A_H$ of the hybrid fiber is determined according to the equation:

$$\frac{A_H}{A_2} = \frac{(G-1)/G}{\left[\frac{A_2}{A_1} + \left(1 - \frac{A_2}{A_1}\right)\frac{1}{G^x} - \frac{1}{G}\right]}$$

where:
- $A_H$ is the effective area of the hybrid fiber;
- $A_1$ is the effective area of the first fiber;
- $A_2$ is the effective area of the second fiber;
- $G$ equals $\exp(\alpha L_{span})$, where $\alpha$ is the effective absorption coefficient of the hybrid fiber and $L_{span}$ is the length of the hybrid fiber; and
- $x$ is the fraction of the total span length of the hybrid fiber represented by the first fiber.

12. The method of claim 11 wherein $x$, $G$, $A_1$, $A_2$, and the first and second fiber dispersion characteristics are selected such that D and $A_H$ are optimized for best system performance, and such that $A_H/A_2$ is larger than about 1.1.

13. A method for increasing the effective area of optical transmission fiber, comprising the steps of:
 selecting a first fiber segment having a first effective area and a first fiber dispersion characteristic at a predetermined operating wavelength;
 selecting a second fiber segment having a second effective area and a second fiber dispersion characteristic at the predetermined operating wavelength, wherein the first effective area is larger than the second effective area; and
 joining the first and second fiber segments to form a hybrid fiber having a length-weighted fiber dispersion characteristic and a third effective area which is substantially greater than the second effective area.

14. The method of claim 13 further comprising the step of coupling the hybrid fiber to a light source such that the first fiber segment is disposed nearer to the source than the second fiber segment.

15. The method of claim 13 wherein for a predetermined average fiber dispersion characteristic of the hybrid fiber, the effective area $A_H$ of the hybrid fiber is determined according to the equation:

$$\frac{A_H}{A_2} = \frac{(G-1)/G}{\left[\frac{A_2}{A_1} + \left(1 - \frac{A_2}{A_1}\right)\frac{1}{G^x} - \frac{1}{G}\right]}$$

where:
- $A_H$ is the effective area of the hybrid fiber;
- $A_1$ is the effective area of the first fiber;
- $A_2$ is the effective area of the second fiber;
- $G$ equals $\exp(\alpha L_{span})$, where $\alpha$ is the effective absorption coefficient of the hybrid fiber and $L_{span}$ is the length of the hybrid fiber; and
- $x$ is the fraction of the total length of the hybrid fiber represented by the first fiber.

16. The method of claim 13 wherein the first fiber segment has an effective area of about 83 $\mu m^2$ at an operating wavelength near 1550 nm.

17. The method of claim 15 wherein the hybrid fiber has an average fiber dispersion characteristic in the range of about 0 to 3 ps/(nm·km) at the operating wavelength.

18. The method of claim 13 wherein the second fiber segment comprises a dispersion-shifted optical fiber.

19. The method of claim 13 further comprising the step of joining a third fiber segment to one of the first and second fiber segments to form the hybrid fiber.

* * * * *